United States Patent [19]

Sweet

[11] 4,001,789
[45] Jan. 4, 1977

[54] MICROPROCESSOR BOOLEAN PROCESSOR

[75] Inventor: Anthony William Sweet, Bishops Stortford, England

[73] Assignee: ITT Industries, Inc., New York, N.Y.

[22] Filed: May 23, 1975

[21] Appl. No.: 580,274

[52] U.S. Cl. .............................. 340/172.5
[51] Int. Cl.² .............. G06F 13/00; G06F 13/06; G06F 3/00
[58] Field of Search ................... 340/172.5

[56] References Cited
UNITED STATES PATENTS

| | | | |
|---|---|---|---|
| 3,753,243 | 8/1973 | Ricketts, Jr. | 340/172.5 |
| 3,761,882 | 9/1973 | Bartlett | 340/172.5 |
| 3,798,606 | 3/1974 | Henle | 340/172.5 |
| 3,821,715 | 6/1974 | Hoff, Jr. | 340/172.5 |
| 3,827,030 | 7/1974 | Seipp | 340/172.5 |
| 3,849,765 | 11/1974 | Hamano | 340/172.5 |
| 3,855,577 | 12/1974 | Vandierendonck | 340/172.5 |

Primary Examiner—Mark E. Nusbaum
Assistant Examiner—James D. Thomas
Attorney, Agent, or Firm—John T. O'Halloran; Peter C. Van Der Slys; Vincent Ingrassia

[57] ABSTRACT

A special purpose microprocessor with a limited number of functions, which can be used to interface between a central processor and a portion of a telephone exchange—for example, in line scanning. Six bit addressing and decoding are employed with two logic elements performing the few available programs. The processor includes a random access memory for intermediate storage, one logic unit and has capacity for 64 memory locations. The logic unit includes two NAND gates.

8 Claims, 8 Drawing Figures

4,001,789

MICROPROCESSOR BOOLEAN PROCESSOR

This invention relates to data processing equipment and especially to such equipment for use in the performance of relatively simple data processing operations.

The need for such processors exists in such systems as telephone exchanges where a digital computer is used as the central controlling element of an exchange in which a multitude of electro- mechanical devices such as relays and either reed relays or cross-bar switches are to be used. Such processors can be used, inter alia, as an interface between the computer and the controlled equipments.

According to the invention, there is provided electrical data processing equipment, which incudes inputs via which data to be processed is received, a set of input staticisers to which said inputs are connected so that the data to be processed in stored in said staticicers, a set of output staticisers to which the results of the data processing operations performed by the equipment are applied, outputs connected to the output staticisers via which said results can be extracted from the equipment, a random access memory in which intermediate processing results and/or additional information for use in connection with data processing operations to be performed by the equipment are stored, an instruction input via which instruction words can be received each of which words includes an address portion and a function portion, first address selection means under control of the address portion to select data to be processed, a logic circuit adapted, under control of the function portion of an instruction word to process data supplied to the logic circuit via said address means, and second address selection means also under control of the address portion to route data processing results either to said memory or to an output staticiser, wherein each of the operands on which the data processing operations are performed in a one-bit binary operand, and wherein each of the results of a said data processing operation is also a one bit binary number.

Embodiments of the invention will now be described with reference to the accompanying drawings, in which.

The processors described herein, referred to as Boolean processors, are programmable logic devices each of which can replace a relatively slow-speed wired logic circuit. Such a device is a one bit processor for evaluating the Boolean equations forming a logic system specification.

Figure 1:
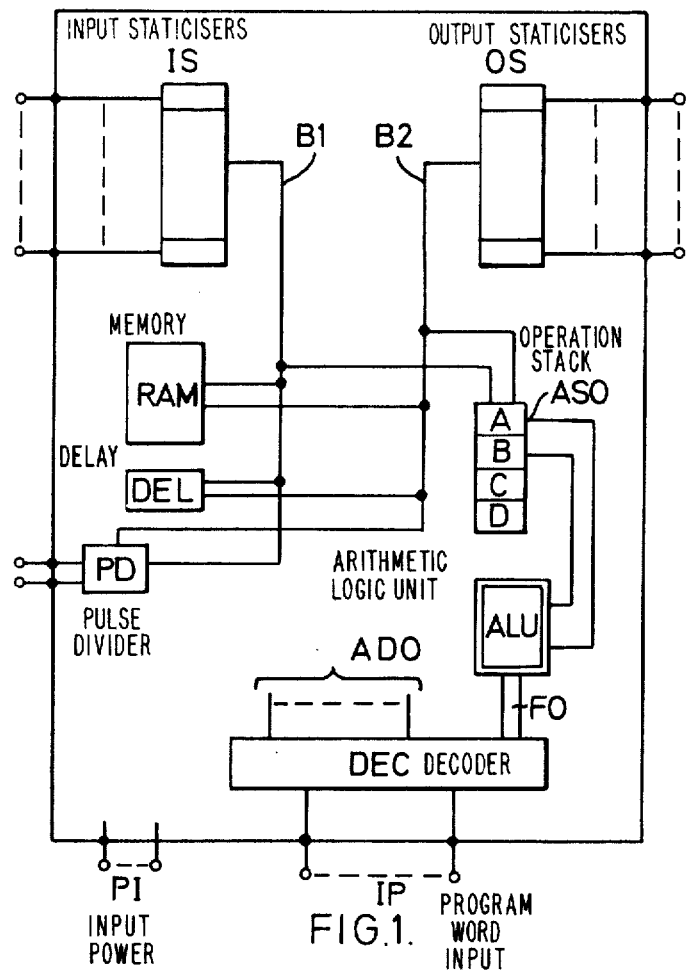
FIG. 1 is a block diagram of a first processor according to the invention.

The first embodiment shown in FIG. 1 has a set of input staticisers IS to which are applied the input conditions to be evaluated or processed. These can include such information as the condition, looped or unlooped, of a telephone line, and of that line's condition on a previous examination. In this example, a function needed could be to signal to the exchange's central processor if the line condition has changed. There is also a set of output staticisers OS, in which the results of processings are stored for sending to "user" equipments. These staticisers are connected to the single-wire internal busses B1 and B2.

There is also a small internal random access memory RAM to meet the working memory needs of the processor, and in general one bit in this memory replaces one bistable in a wired logic system. The processor's program is held in an external device such as a read-only memory which, if the program is fixed cycle without branching, can be shared among a number of processors, which could apply in the line loop application. The number of processors controllable from one program memory depends on security considerations and on power drive capabilities. The program memory supplies the instruction words sequentially via a set of inputs to a decoder DEC, which has address outputs and function outputs. The address outputs ADO go to read and write selection circuits (not shown) with access to the staticisers, the memory RAM, and such other elements as needed by the program. The function outputs FO go to an arithmetic logic unit ALU which does the actual processing. Associated with ALU is an operation stack ASO with four stages A-D: this is in effect a reversible shift register. There elements are all connected to the busses B1 and B2; also connected to these busses are a set of delay elements DEL and a pulse divider PD.

The pulse divider receives clock pulses from the clock of the system which uses the processor, and it produces the clock pulses the processor needs by pulse division in known manner. The delay elements DEL consist of one or more shift registers: when a bit has to be delayed for a given period, this can be done by driving it along a shift register in DEL. The processor receives its power via inputs PI. Thus the device is a one-bit digital computer, but without a program store, since the program words are applied to it via the inputs IP. Within the processor, all inter-unit data flow is via the busses B1 and B2 and the stack ASO.

The program is coded into eight bits, of which six specify an address location (input staticiser, output staticiser, bit of RAM, delay element, clock), and two specify one of four functions. As mentioned above the program is cyclic, being stepped continually by an external clock with the program steps presented to the processor(s), one per step. The instruction set is:

| | | | |
|---|---|---|---|
| (a) "READ" | RD | (b) "READ AND COMPLEMENT" | RD̄ |
| (c) "AND (WRITE)" | AND | (e) "OR (WRITE)" | OR |

The functions RD and $\overline{\text{RD}}$ transfer data from the address location specified in the instruction to the top stage A of the stack ASO. As new data enters ASO, its existing contents "ripple" downwards into successively lower portions, the data leaving D being lost.

AND and OR perform the Boolean operations AND and OR respectively on the contents of stages A and B of ASO, the results being written in an address specified in the instruction, and also being placed in stage A. When this occurs the other stages move up once, D being set to O.

The "all zeroes" address is used as a dummy address, i.e. it is not allocated to a physical location, being used for special purposes with all four instructions. Thus RD with the all zeroes address sets stage A of the stacks ASO to O, while $\overline{\text{RD}}$ with the same address sets A to 1. The all zeroes address is used with AND and OR when the result of the Boolean operation does not have to be placed in a particular location, merely remaining in A for use in a later Boolean operation.

In telephony one often needs to delay the operation and release of relays for timing and for differentiation between signals. This can be done by using clockdriven shift registers, and the block DEL contains five such shift registers to which may be connected any one of seven internal clocks of different frequencies, obtained from the pulse divider PD. The input, output, and clock of such a register are each addressable as one address location. The clocks used and the lengths of the shift registers provide delays ranging from 25 ms to 5 seconds, and the accuracy of the timing depends on the number of stages in the registers.

Figure 2:
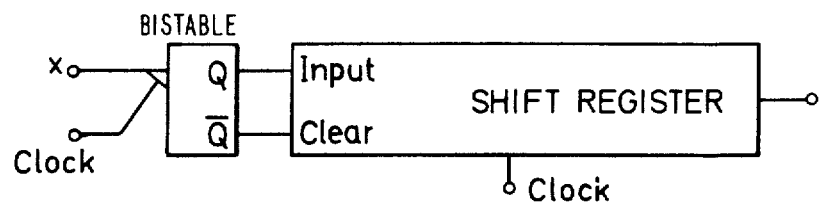
FIG. 2 is a shift-register delay element, usable in the processor of FIG. 1, and also in that of FIG. 3.
Figure 3:
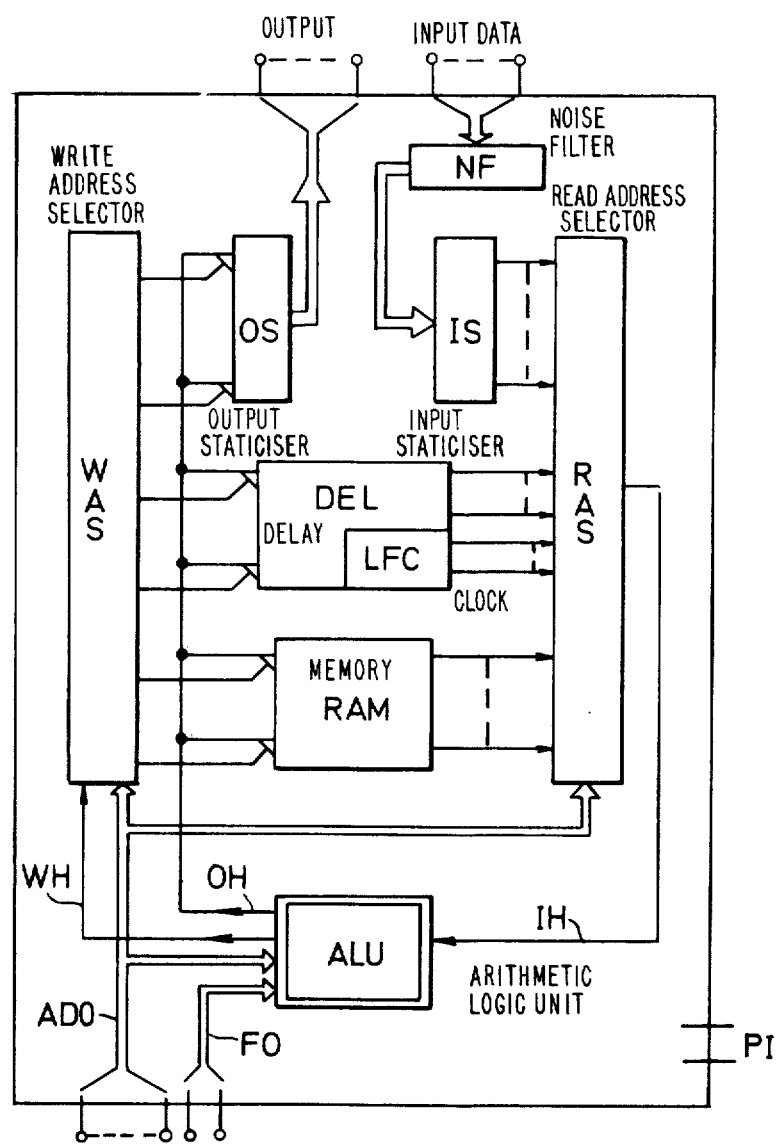
FIG. 3 is a block diagram of a second processor according to the invention.

FIG. 2 shows one example of a delay element usable in the block DEL, FIG. 1, and also usable in the processor of FIG. 3, to be described later. It is a so-called inertial delay element, and it delays the leading edge, but not the trailing edge of a pulse. It consists of a clocked bistable which drives a clocked shift register. If the time for which the signal input is high is less than the delay introduced by the register than no output is obtained from it. To delay the trailing edge only, the same circuit is used, but in this case the input signal is inverted before it reaches the delay element, and one takes the inverse of the output from the shift register.

In some cases it is not convenient to implement a delay by shift register: in this case the effect can be achieved in "software manner" by programming.

The total addressing field, with 6 bits available, has 64 locations, as follows (assuming that the processor is used in a centrally controlled telephone exchange).

a. Locations 1–10

Standard signals sent or received between the processor and central control, some of which are "write only", one of the staticisers OS being cleared when its content is sent out, and some of which are "read only", for signals to I.S., one of the staticisers IS being cleared when its content is read.

b. Location 11–18

Inputs and outputs from and to the associated peripheral circuit hardware (e.g. relays), inputs being "read only" and outputs "write only".

c. Locations 19–23

Delay elements.

d. Locations 24–30

The built-in clocks (from PD).

e. Locations 31–63

These are the bits of RAM, used as "working " storage when processing.

f. Location 0

With function RD this sets stage A of ASO to O and with $\overline{\text{RD}}$ it sets A to 1. It is also used as a dummy address (see above) with functions AND and OR.

The program is so devised that the processor can be used to replace a number of relays in a switching circuit. Thus it can do such functions as compare the current state of a line loop or a relay with its state, say, 100 ms. ago, or produce an output when certain specified set of conditions exist. Some of these functions need a large number of program steps (e.g. 250), but the time taken to produce a result is compatible with the operating times of electromagnetic components. Thus in many cases, such processors are a convenient interface between a digital computer and various elements of a telephone exchange. The blocks in FIG. 1 can each follow conventional practice, and such a processor is preferably made as a single-chip integrated circuit, e.g. using MOS techniques. It could, if desired, be implemented using discrete components, but this would lose many of the benefits obtainable from small size.

We now turn to the second – and at the time of writing preferred – embodiment of the invention, FIGS. 3–6. This differs in a number of respects from the processor of FIG. 1, but where possible the same references are used for the same circuit elements. This processor, when made as a single-chip integrated circuit unit, has some resemblance to a 64 bit read-write random access memory unit. Much of the circuitry shown is decoding logic used to address data stored in the processor. The 6 -bit addresses are applied directly via inputs ADO to the decoders, in this case the write address selector WAS and the read address selector RAS, and for a whole program step the input and output data highways IH and OH for the logic unit ALU are connected to the appropriate storage bit. Note that, as in FIG. 1, the staticisers IS and OS, the delay elements DEL and the clock LFC are treated as address locations. A write pulse is generated within ALU when data is clocked therefrom into an address location, which pulse is sent from ALU over the highway WH.

Inputs to the processor come via noise filter inertial delay circuits NF, which delay the input transitions, so that suprious signals are not "seen" by the processor, and from NF the input data reach the input staticisers IS. At the start of each program cycle, the information at the outputs of NF is latched into the staticisers IS under control of a clock signal generated when a particular program word is used, which word is put at the beginning of each program. The outputs of IS are connected into the address selector RAS, which provides the inputs to the logic unit ALU via the highway IH, and are treated as address locations, like the outputs from the bit cells of RAM. As "seen"by the logic unit ALU, they are read-only storage. Similarly the output staticisers OS are connected to WAS, and appear to ALU as write-only storage whose outputs are acceasible to the outside world.

The delay units in the block DEL (see FIG. 2) each have three addressable points, the input, output and clock input. The first two are treated in the same way as one bit of RAM, although the output is from the end of a shift register. The input to the clock LFC is a write-only location, like OS, and the read-only locations with the same addresses contain a range of low frequency clocks usable as the delay unit clocks. These clocks are only high for one program cycle, and so must be reset by the clock used for IS.

Figure 4:
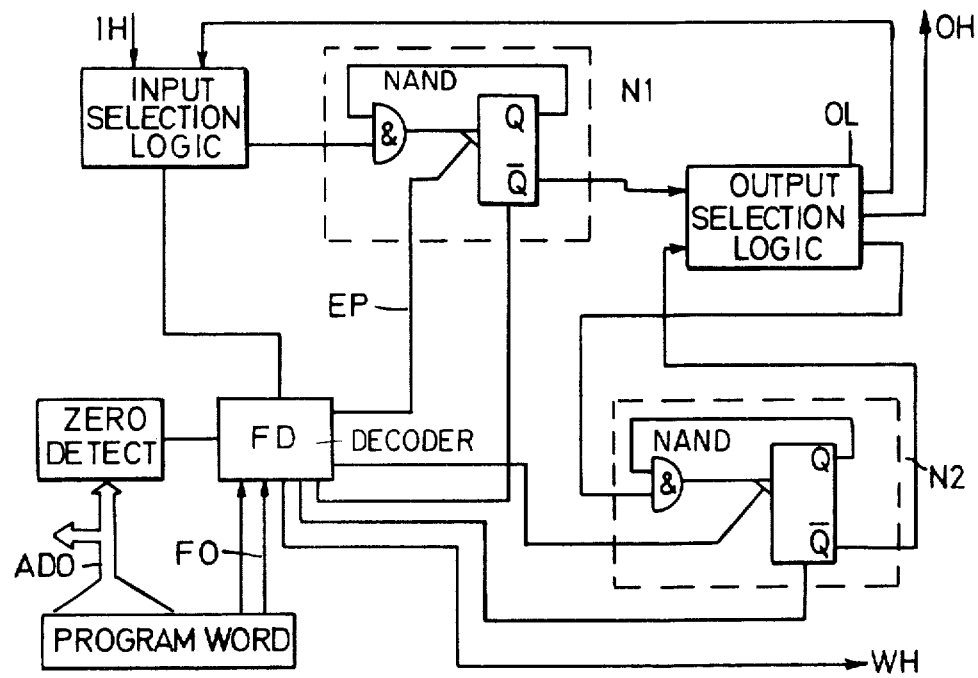
FIG. 4 is a schematic of the logic unit of the processor of FIG. 3.

The heart of the processor is the unit ALU, which performs the Boolean operations on the stored data. This, FIG. 4, is based on two-level NAND units N1 and N2, each including an AND gate and a latch. When a clock pulse is applied to the latch of such a NAND unit via its connection such as EP, its contents are up-dated so that they becoming the "ANDing" of the previous data in the unit and of an input thereto. The output of such a NAND unit is the inverse of the data in the bistable.

The unit ALU also includes control circuitry FD which decoded the function bits of a program word (received via FO) and also detects an "all zeroes" address, and some gates to route signals from one NAND unit to the other. When the function bits of an instruction are RD, the input of NAND unit N1 is connected via the Input Selection Logic (part of RAS) to the output line from the storage units in the rest of the processor. In addition, a clock pulse is generated for N1, whose latch was previously set to 1 on the last NAND instruction. Further RD instructions are similarly treated and the AND total is built up on the bistable of N1. Note that the four functions used in the processor of FIGS. 3–6 are not quite the same as those of that of FIG. 1. Here they are:

a. RD – read data into the first NAND unit N1 b. $\overline{RD}$ – read the complement of this data into the first NAND unit N1 c. ND – transfer data from N1 to N2 if address is zero, or for any other address write data thereto d. WR – write the data in N2 back to the input of N1 if the address is zero, or for any other address write data thereto.

When a NAND instruction is decoded, the control FD checks that the address is zero, and the output selection logic OL switches the output of N1 to the input of N2, and generates a clock pulse for the latch of N2, which was previously set to 1. If the address is *other than* zero, FD switches the output of N1 to the output data highway OH (FIG. 3), and also generates a write pulse sent out over lead WH. Another series of RD (or $\overline{RD}$) instructions should now be decoded, and N1 fills up with the "NANDing" of the data held in the associated addresses, since the NAND instruction cleared the previous total in N1. Another NAND O instruction causes the control FD to clock the latch of N2, and to fill it with its previous contents AND the output of N1. A write instruction WR presents the output of N2 to the output data highway OH and generates a write pulse (sent over WH) unless the associated address is O, in which case this data is fed back into N1 as new input data. In this respect the operation resembles that of the processor of FIG. 1.

Other latches or bistables in the control FD allow it to "remember" previous instructions, so that shorter programs can be used. Thus there is no need to have NAND O, WRITE X (RD-O, WR-X) since if WR-X immediately follows a read instruction both are executed. Similarly, if a WR instruction is decoded the output is held in a latch, so that if another WR instruction follows the same data can be sent out. In the absence of this facility, the whole processing operation would have to be performed again if the result has to be written in more than one location.

The logic unit ALU can be based on AND/OR, OR/AND, NOR/NOR or NAND/NAND, all of which are equivalent in terms of the number of instructions needed for a given equation. The latter two are more flexible as they allow a result to be complemented (if necessary) by one additional instruction, whereas with the former two, two additional instructions are needed. NAND/NAND is preferred as it is compatible with the "normal form" sum of products used to write Boolean equations.

The logic unit ALU sometimes has to do two operations in one program step, as well as clearing data in one of the latches, so three phases of clock are needed in each program step. Thus the processor's main clock must be three times the frequency of the clock which drives the program counter.

Figure 5:
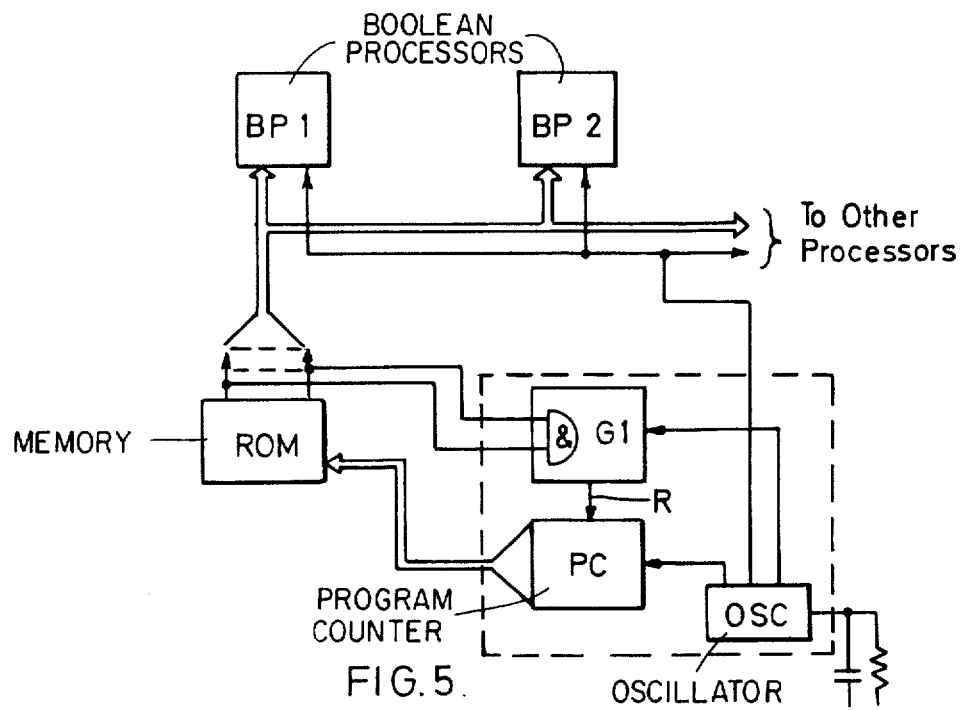
FIG. 5 is a program generation circuit, usable with the processors of FIGS. 1 and 3.

Now the program generation circuit, FIG. 5, which is associated with, but not part of the processor, will be described. The program words themselves are held in a standard read-only memory ROM, e.g. of 256 eight-bit words. which as indicated, can serve a number of similar Boolean processors such as BP1 and BP2. The number servable is limited by drive limitations and security considerations. Each of the words in ROM is addressed in turn by a program counter PC. As programs may be of different lengths, the counter PC is reset by the last word in the program, and the "all ones" instruction word WR63 is used for this because it is easily detected. This word activates and 8-input AND gate G1 which resets PC via the connection R when the last word of a program is read out.

A clock is needed to drive the counter PC and the processors, and this clock can either be fed to several programs (in different stores such as ROM) or generated locally at each counter PC. This second method is used as it enhances system security and reduces interconnections between units. A highly stable and accurate clock is not needed as it is only used within the Boolean processor system and is not related to any of a processor's inputs and outputs. Hence a simple RC oscillator OSC can be used. The counter, reset circuit and oscillator, which are shown inside a dotted box, could be on a single LSI chip. They may even be combined on the same chip with ROM, to give a chip with no more than 16 pins, which would be the only component external to the processor needed to make it work.

Several possible LSI techniques can be used to make Boolean processors such as described herein: no technology is ruled out because of speed restrictions. With metal gate MOS the chip is about 140 X 140 mils, which is a medium sized chip. Slightly less area is needed for collector diffusion isolation (CDI), in which case it may be possible to have relay drivers on the chip due to the high current capabilities of CDI. Also the circuits could, if needed, be run at higher speeds than for the MOS case.

The Boolean processor program consists in essence of a list of system definition equations evaluated sequentially, one at a time, in a fixed cycle. For correct operation the inputs must not change during a program cycle, hence the staticisers IS, so the first step in the cycle is to clock these staticisers. To do this, a single address is allocated to these clocks, and the address decode output therefor is connected directly to the clock line so that only the address part of the program word is effective when accompanied by either the ND or WR instruction. Thus the same address can be used with either of the read instructions (RD or $\overline{RD}$) to read an internally-divided clock such as LFC.

The following indicate a few typical Boolean equations, with the codings used.

| X = A.B.C.D.E | X = A+B+C+D+E |
|---|---|
| RD A | RD A |
| RD B | RD B |
| RD C | RD C |
| RD D | RD D |
| RD E | RD E |
| WR X | ND X |

Note that the only difference is that when "ANDing" the last instruction is WR, whereas when "ORing" it is ND.

| X = (ABC+DE)FG + JKL | |
|---|---|
| (1) RD A | (8) RD F |
| (2) RD B | (9) RD G |
| (3) RD C | (10) ND O |
| (4) ND O | (11) RD J |
| (5) RD D | (12) RD K |
| (6) RD E | (13) RD L |
| (7) WR O | (14) WR X |

For equations with only AND or OR functions, i.e. single level, the number of steps equals the number of variables. Where there are two or more logic levels (e.g. AND and OR), the number of steps is the number of variables, plus the number of OR operations, plus the number of brackets used.

One can often reduce the number of steps by using additional bits of RAM. For example, the equation $$X = A+B+C+D+E++ J.K.L.M$$

as it stands needs 10+5 =15 steps, but if it is re-written as two equations:

$$Y = A+B+C+D+E+$$

$$X = Y + J..K.L.M.$$

we have six steps for the first equation and seven for the second one. This needs one bit of RAM to store the interim result Y. This technique is valuable where enough RAM bits exist.

The RAM bits are use in two ways, (a) to store status-defining variables and (b) to store partial results. The first is fundamental to sequential switching circuit operation, and needs the status-defining variable to be permanently assigned to a particular RAM bit throughout the program cycle. The second use is not essential, but can be useful, as indicated above. A particular bit of RAM can store different partial results at different points in the program cycle.

The processing "power" of the Boolean processor is related to the size of its RAM, which is limited by the available addressing range. However, the effective memory size can be increased by the use of a so-called one-bit FIFO: this is a first in, first out store with a number of memory elements but only one input port and one output port. Data written in by successive write instructions is read out in the same order by successive read instructions, and the FIFO can be addressed as if it were a single bit of RAM. Such a memory, which is functionally a delay-line store, is particularly suited to the storage of variables associated with the "software" realisation of shift registers, delay elements and ripple-through counters.

Figure 6:
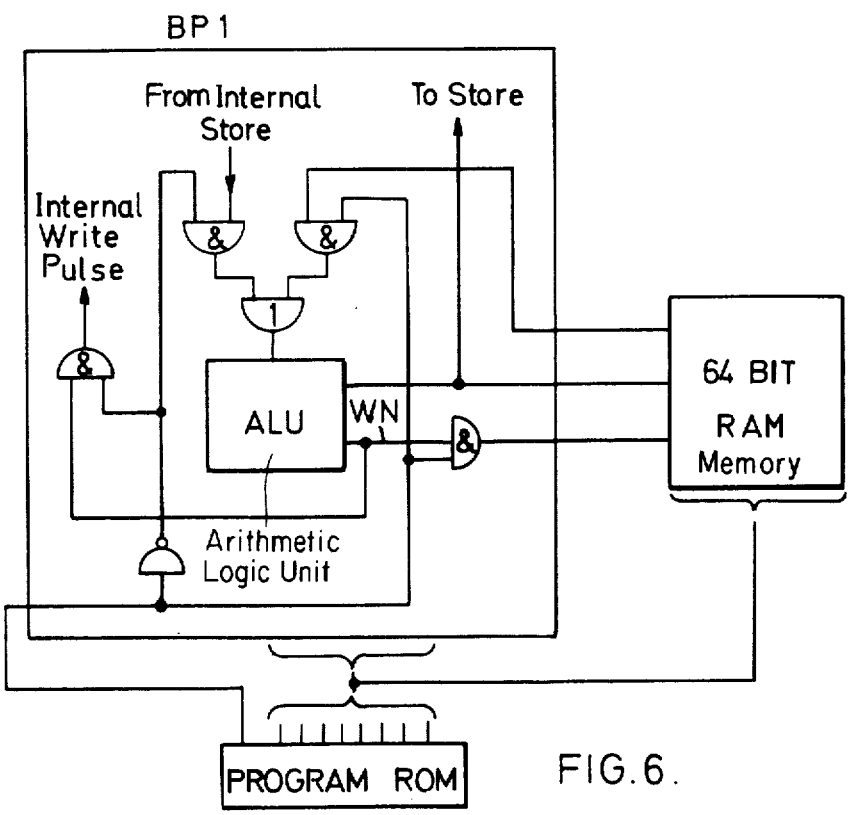
FIG. 6 shows how an external random access memory can be used with a processor according to the invention.

If the processor's data line is brought out to an external connection, additional RAM can be introduced as shown in FIG. 6 where an external 64 bit RAM is added to the processor BPI. The programs word is extended to 9 bits to allow for the doubled address range now needed. Change-over from internal to external addressing is by the "external RAM enable" input ERA to BPI. Naturally further increase in the program word length allows more external RAM to be addressed.

Figure 7:
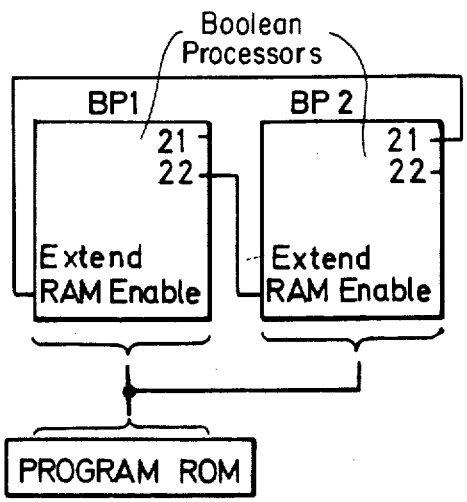
FIGS. 7 and 8 show how two processors according to the invention can be worked together.
Figure 8:
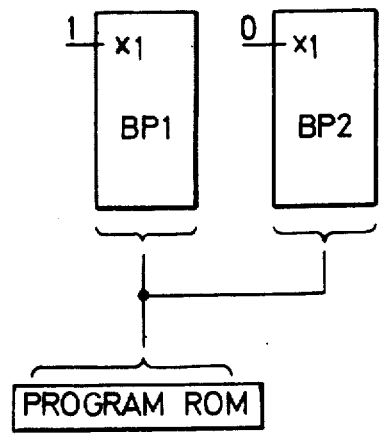

Another way to make additional inputs, outputs and delay elements available is to use two (or more) Boolean processors in combination. For this, one must be disabled while the other is working and some means of switching from one processor to the other is needed, see FIGS. 7 and 8. FIG. 7 uses spare outputs on each processor to control program changeover, while FIG. 8 uses spare inputs. Both methods can be made available to permit flexibility in use.

It is to be understood that the foregoing description of specific examples of this invention is made by way of example only and is not to be considered as a limitation on its scope.

I claim:
1. Electrical data processing equipment, comprising:
a plurality of inputs via which data to be processed is received;
a set of input staticisers coupled to said inputs for storing said data;
a plurality of outputs via which results can be extracted from said equipment;
a set of output staticisers coupled to said outputs, said out-put staticisers having applied thereto results of data processing operations performed by said equipment;
a random access memory for storing intermediate processing results
an instruction input via which instructions are received, each instruction including an address portion and a function portion;
first address selection means coupled to said address portion, said random access memory and said input staticisers for selecting data from said input staticisers to be processed and for retrieving data from said random access memory
a logic circuit coupled to said function portion and said first address selection means for processing data supplied by said first address selection means; and
second address selection means coupled to said address portion, said logic circuit, said output staticisers and said random access memory for applying outputs of said logic circuit to said output staticisers and said random access memory

2. Electrical data processing equipment according to claim 1 wherein each of the operands on which the data processing operations are performed is a one-bit binary operand, and wherein each of the results of said data processing operation is a one-bit binary number.

3. Equipment as claimed in claim 2, and in which said logic unit includes two cascaded NAND circuits responsive to said function portion for performing the required data processing operation.

4. Equipment as claimed in claim 3, in which the first of said NAND circuits receive data from the random access memory and the input staticisers while either of said NAND circuits can supply results to said random access memory or the output staticisers, in which each said NAND circuit has an output connectable via a control circuit to the other of the NAND circuits, and in which said control circuit is controlled by the function portion of said instruction words.

5. Equipment as claimed in claim 4, in which each said NAND circuit consists of a two-input AND gate having its output connected, under control of the control circuit, to the 1 side of a latch, a connection from the 1 side of the latch to one input of said gate, an input connection to the NAND circuit connected to the other input of the gate, and an output from the 0 side of the latch.

6. Equipment as claimed in claim 5, and which includes first and second one-bit busses to which the staticisers, the random access memory and the logic unit are all connected.

7. Equipment as claimed in claim 6, and which includes delay elements each of which is available if needed to delay an operand by a predetermined increment of time, and clock means to generate clock pulses at a plurality of bit rates.

8. Equipment as claimed in claim 7, and which is formed as a single chip integrated circuit unit.

* * * * *